(12) United States Patent
Xu et al.

(10) Patent No.: US 10,257,759 B2
(45) Date of Patent: Apr. 9, 2019

(54) LOAD BALANCING AMONG WIRELESS ACCESS POINTS

(71) Applicant: Hewlett-Packard Development Company, L.P., Houston, TX (US)

(72) Inventors: Xunteng Xu, Beijing (CN); Jun Qing Xie, Beijing (CN); Qun Yang Lin, Beijing (CN); Shuai Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 111 days.

(21) Appl. No.: 15/112,794

(22) PCT Filed: Jan. 20, 2014

(86) PCT No.: PCT/CN2014/070877
§ 371 (c)(1),
(2) Date: Jul. 20, 2016

(87) PCT Pub. No.: WO2015/106450
PCT Pub. Date: Jul. 23, 2015

(65) Prior Publication Data
US 2016/0337923 A1    Nov. 17, 2016

(51) Int. Cl.
*H04W 36/22* (2009.01)
*H04L 12/803* (2013.01)
(Continued)

(52) U.S. Cl.
CPC ......... *H04W 36/22* (2013.01); *H04L 43/0894* (2013.01); *H04L 47/125* (2013.01); *H04W 28/08* (2013.01); *H04W 36/08* (2013.01); *H04W 36/38* (2013.01); *H04L 47/14* (2013.01); *H04W 84/12* (2013.01)

(58) Field of Classification Search
CPC ..... H04W 36/22; H04W 36/08; H04W 36/38; H04W 28/08; H04W 84/12; H04W 84/14
See application file for complete search history.

(56) References Cited

U.S. PATENT DOCUMENTS 7,203,183 B2    4/2007    Cromer et al.
7,688,788 B2    3/2010    Gefflaut et al.
(Continued)

FOREIGN PATENT DOCUMENTS

| CN | 1571385 A | 1/2005 |
|---|---|---|
| CN | 102802232 A | 11/2012 |
| WO | WO-2013152305 | 10/2013 |

OTHER PUBLICATIONS

A Trigger-based Dynamic Load Balancing Method for WLANs Using Virtualized Network Interfaces—2013 IEEE Wireless Communications and Networking Conference (WCNC): Networks. Authors: Masahiro Kawada, Morihiko Tamai, Keiichi Yasumoto—Retrieved date Jul. 20, 2016—6 pages.

(Continued)

*Primary Examiner* — Kent K Krueger
(74) *Attorney, Agent, or Firm* — Brooks, Cameron & Huebsch, PLLC

(57) ABSTRACT

Load balancing among wireless access points (APs) can include a plurality of wireless APs, and a transition-in transition-out (TITO) engine instructing a client to dissociate from a first wireless AP selected from the plurality of wireless APs and associate with a second wireless AP selected from the plurality of wireless APs.

15 Claims, 3 Drawing Sheets

(51) Int. Cl.
*H04L 12/26* (2006.01)
*H04W 28/08* (2009.01)
*H04W 36/08* (2009.01)
*H04W 36/38* (2009.01)
*H04L 12/801* (2013.01)
*H04W 84/12* (2009.01)

(56) References Cited

U.S. PATENT DOCUMENTS

2004/0105416 A1    6/2004    Rue
2005/0163077 A1    7/2005    Suda
2006/0126555 A1    6/2006    Wang et al.
2010/0290397 A1    11/2010   Narayana et al.

OTHER PUBLICATIONS

A Model Proposal to Optimize Bandwidth Usage in Multi-access Wireless Networks—Technical Gazette 19, 4 (2012), 939-945—Authors: Murat Koyuncu, Mehmet Kazim Gercek—Date retrieved Jul. 20, 2016—7 pages.
ISR—PCT Appl No. PCT/CN2014/070877—dated Sep 16, 2014—9 pages.
S. Venkatesan and C. Manoharan, 2012. Access Point Selection for Fair Load Balancing in Wireless LAN. Information Technology Journal, 11: 283-288.—Published: Dec. 31, 2011—URL: http://scialert.net/abstract/?doi=itj.2012.283.288.
Wi-Fi Alliance (Registered) Technical Committee, Hotspot 2.0 (Phase 2) Technical Specification, Version 3.08, 2013.
Papanikos et al., "A Study on Dynamic Load Balance for IEEE 802.11b Wireless LAN," Proc. Int'l Conf. Advances in Comm. and Control Systems (COMCON '01), 2001, 7 pages.
Judd et al., "Fixing 802.11 Access Point Selection," ACM SIGCOMM Poster, vol. 32 Issue 3, Jul. 2002, pp. 31-31.
IEEE Standard for Information technology—Local and metropolitan area networks—Specific requirements—Part 11: Wireless LAN Medium Access Control (MAC) and Physical Layer (PHY) Specifications—Amendment 8: Medium Access Control (MAC) Quality of Service Enhancements, in IEEE Std 802.11e-2005 (Amendment to IEEE Std 802.11, 1999 Edition (Reaff 2003) ,2005, pp. 1-212.
Fukuda et al., "Decentralized Access Point Selection Architecture for Wireless LANs—Deployability and Robustness for Wireless LANs," Proc. IEEE Vehicular Technology Conf., Sep. 2004.
E.Garcia Villegas, R. Vidal Ferré, and J. Paradells. Load balancing in WLANs through IEEE 802.11k mechanisms. In Proceedings of the IEEE Symposium on Computers and Communications (ISCC'06), Jun. 2006.
Bejerano et al., "Fairness and Load Balancing in Wireless LANs Using Association Control," Proc. ACM MobiCom, 2004, pp. 315-329.
Balachandran et al., "Hot-Spot Congestion Relief in Public-Area Wireless Networks," SIGCOMM Computer Comm. Rev., 2002, 70 pages.
Bahl et al., "Cell Breathing in Wireless LANs: Algorithms and Evaluation," IEEE Trans. Mobile Computing, vol. 6 Issue 2, Feb. 2007, pp. 164-178.

LOAD BALANCING AMONG WIRELESS ACCESS POINTS

BACKGROUND

A computer network or data network is a telecommunications network that allows computers to exchange data. Wireless computer networks can have configured devices (e.g., wireless access points (APs)) that act as transmitters and receivers of wireless signals. Users (e.g., mobile devices) can connect to wireless APs and join wireless computer networks. Wireless APs can vary in security and speed with which individual users can access data in the computer network.

DETAILED DESCRIPTION

Figure 1:
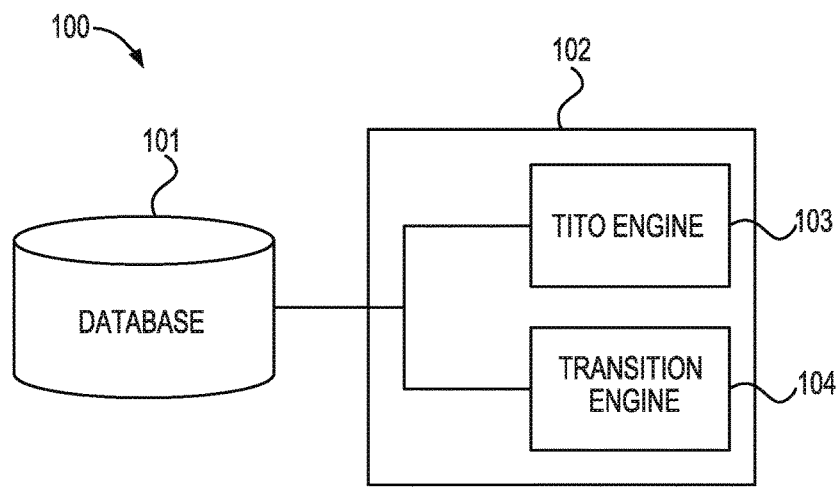
FIG. 1 illustrates a diagram of an example of a system for load balancing among wireless APs in a network according to the present disclosure.

Wireless local area networks (WLANs) have become a popular technology for access to the Internet and enterprise networks. As operators and service providers increase WLAN APs in many public areas (such as shopping malls, libraries, etc.) for better coverage, WLAN users have higher chances to receive more than one AP signal in one spot. WLAN users must determine which AP to associate with. If an inappropriate AP is selected, a user may experience bad service (e.g., low throughput), or even degrade other WLAN users' throughputs.

In conventional implementations of WLANs under infrastructure mode, each mobile device (e.g., client and/or mobile station) (STA) scans multiple wireless channels to detect the APs within the communication range, and chooses an AP that has the strongest received signal strength indicator (RSSI). As such, an STA generally associates with an AP that has the strongest signal. However, this association approach can lead to inefficient use of the wireless network resources. In such an approach, information about the current traffic load (e,g., channel utilization) of the AP is not considered. Therefore, even though there are may be less loaded APs in the region, most STAs may still associate with the same AP, and experience severe congestion. Furthermore, the throughput of mobile devices that are already associated with an AP may be severely affected by newly joined mobile devices with higher traffic demand. This imbalance in traffic load distribution results in inefficient resource utilization and poor performance.

Furthermore, when considering WLAN load balancing, two aspects should be considered: intra-AP load balancing and inter-AP load balancing. Intra-AP load balancing requires each AP to balance the traffic load to its associated mobile devices based on a given objective or metric. Intra-AP load balancing has been addressed by methodologies such as those described in IEEE 802.11e. Inter-AP load balancing addresses determining mobile device association for ensuring load balance across all APs. Since the load of each AP within a network frequently changes as a result of varying channel conditions and bursts in mobile device traffic, short-term load balancing causes instability of the network as users are constantly shifted between APs. To prevent system instability, long-term channel condition and user traffic should be managed.

Approaches to addressing AP load imbalance fail to guide mobile devices to associate with a proper AP and balance the load among multiple APs in the network in order to guarantee high throughput and achieve efficient use for the network. One approach to address load imbalance incorporated the APs' load into an association scheme. For instance, a mobile device can be associated with an AP based on RSSI and the number of mobile devices associated with each AP in the network. In other approaches, each AP in the network can maintain a measurement of their load, and can broadcast beacons containing this load to mobile devices. New mobile devices (e.g., those joining the network and not yet associated with an AP) can receive beacons from multiple APs and use this information to associate with the least loaded AP. Similarly, other approaches suggest that mobile devices associate with the AP that can accommodate its minimum bandwidth requirement. When multiple such APs are available, the AP with the highest RSSI is chosen.

Yet another approach could be based on cell breathing models (e.g., algorithms) for WLANs that attempt to maximize the overall system throughput. Cell breathing is implemented by controlling the transmission power of an AP's beacon packets. When an AP becomes heavily loaded, it shrinks its coverage by reducing the transmission power of its beacon packets. This forces redirection of some traffic to a neighboring AP that is lightly loaded, thereby achieving load balancing. However, such approaches assume that the transmission power adjusting is only applied to the beacon frame, and the transmission power of data packets is fixed at the maximum level, in order to avoid degrading mobile device performance. This assumption is not applicable in current commercial APs which change the power of all transmitting frames altogether, without the capability to customize different power levels for different types of frames.

Such approaches have proven ineffective, as they assume that mobile devices deploy an extra, non-standard based, model for AP selection. This requirement is hard to implement, given that wireless cards at mobile devices may not support such models for AP selection. Moreover, the required modules for AP selection may differ from one network to another network (e.g., some networks may require clients to report the information to a centralized server for determining association, while other networks may require clients to make selections by themselves). The different requirements posed by different wireless networks make the deployment even harder.

In contrast, in accordance with examples of the present disclosure, a load balance solution can be based on a newly-released Wi-Fi Alliance standard—Hotspot 2.0 and can utilize a two-part model (e.g., algorithm) to recalculate a better AP for mobile devices according to the real-time traffic load. Furthermore, in accordance with examples of the present disclosure, a transition management system, such as Basic Service Set (BSS) transition management, can be used to instruct Hotspot 2.0 enabled mobile devices to dissociate from heavily loaded APs and associate with less loaded APs. Such a system is compatible with the Wi-Fi Alliance standard—Hotspot 2.0, does not require additional hardware changes to the AP, can be easily deployed, and can effectively balance loads among APs and increase throughput of wireless networks.

Figure 2:
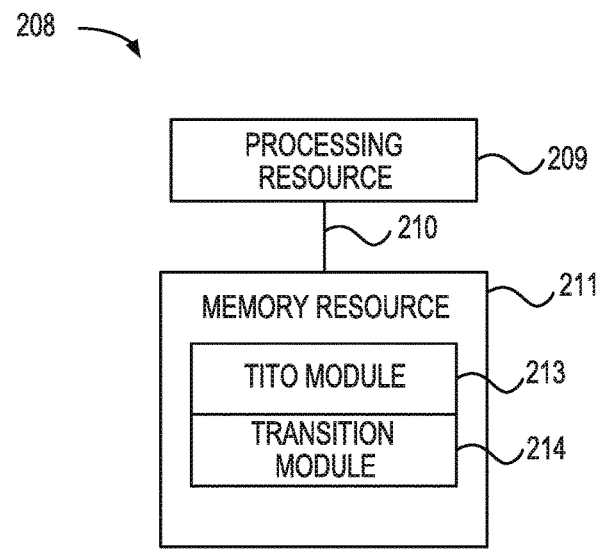
FIG. 2 illustrates a diagram of an example computing device according to the present disclosure.

FIGS. 1 and 2 illustrate examples of systems 100, 208 according to the present disclosure. FIG. 1 illustrates a diagram of an example of a system 100 for load balancing among wireless APs in a network according to the present disclosure. The system 100 can include a database 101, load balancing system 102, and/or a number of engines 103, 104. The load balancing system 102 can be in communication with the database 101 via a communication link, and can include the number of engines (e.g., transition-in transition-out (TITO) engine 103 and transition engine 104). The load balancing system 102 can include additional or fewer engines that illustrated to perform the various functions described herein.

The number of engines 103, 104 can include a combination of hardware and programming that is configured to perform a number of functions described herein (e.g., instruct a mobile station associated with a first wireless AP selected from the plurality of wireless APs to dissociate from the first wireless AP and to associate with a second wireless AP selected from the plurality of wireless AP, based on real-time wireless traffic). The programming can include program instructions (e.g., software, firmware, etc.) stored in a memory resource (e.g., computer readable medium, machine readable medium, etc.) as well as hard-wired program (e.g., logic).

The TITO engine 103 can include hardware and/or a combination of hardware and programming to instruct a mobile station associated with a first wireless AP selected from the plurality of wireless APs to dissociate from the first wireless AP and to associate with a second wireless AP selected from the plurality of wireless AP, based on real-time wireless traffic. The mobile station can include a mobile device (e.g., mobile phone, tablet computer, laptop computer, etc.) and/or other Wi-Fi Hotspot 2.0 enabled devices.

As used herein, the Hotspot 2.0 standard refers to the Hotspot 2.0 standard proposed by the Wi-Fi Alliance Technical Committee. In accordance with the Hotspot 2.0 standard, WLAN APs and WLAN mobile devices must support Basic Service Set (BSS) transition management, which assists mobile devices to disassociate from an AP and guides them to another proper AP in the network.

The transition engine 104 can include hardware and/or a combination of hardware and programming to implement instructions made by the TITO engine 103 by exchanging information between mobile stations and wireless APs. For example, the transition engine 104 can include a BSS transition management system. The BSS transition management system can include a BSS transition management query, a BSS transition management request, and BSS transition management response frames that can provide a means and a protocol to exchange the information needed to enable an AP to inform associated STAs that the current connection will be terminated and to enable a network to manage traffic loads among APs by influencing clients' transition decisions.

FIG. 2 illustrates a diagram of an example computing device 208 according to the present disclosure. The computing device 208 can utilize software, hardware, firmware, and/or logic to perform a number of functions described herein.

The computing device 208 can be any combination of hardware and program instructions configured to share information. The hardware, for example, can include a processing resource 209 and/or a memory resource 211 (e.g., computer-readable medium (CRM), machine readable medium (MRM), database, etc.). A processing resource 209, as used herein, can include any number of processors capable of executing instructions stored by a memory resource 211. Processing resource 209 may be implemented in a single device or distributed across multiple devices. The program instructions (e.g., computer readable instructions (CRI)) can include instructions stored on the memory resource 211 and executable by the processing resource 209 to implement a desired function (e.g., instruct a mobile station associated with a first wireless AP selected from the plurality of wireless APs to dissociate from the first wireless AP and to associate with a second wireless AP selected from the plurality of wireless AP, based on real-time wireless traffic).

The memory resource 211 can be in communication with a processing resource 209. A memory resource 211, as used herein, can include any number of memory components capable of storing instructions that can be executed by processing resource 209. Such memory resource 211 can be a non-transitory CRM or MRM. Memory Resource 211 may be integrated in a single device or distributed across multiple devices. Further, memory resource 211 may be fully or partially integrated in the same device as processing resource 209 or it may be separate but accessible to that device and processing resource 209. Thus, it is noted that the computing device 208 may be implemented on a participant device, on a server device, on a collection of server devices, and/or a combination of the user device and the server device.

The memory resource 211 can be in communication with the processing resource 209 via a communication link (e.g., a path) 210. The communication link 210 can be local or remote to a machine (e.g., a computing device) associated with the processing resource 209. Examples of a local communication link 210 can include an electronic bus internal to a machine (e.g., a computing device) where the memory resource 211 is one of volatile, non-volatile, fixed, and/or removable storage medium in communication with the processing resource 209 via the electronic bus.

A number of modules 213, 214 can include CRI that when executed by the processing resource 209 can perform a number of functions. The number of modules 213, 214 can be sub-modules of other modules. For example, the TITO module 213 and the transition module 214 can be sub-modules and/or contained within the same computing device. In another example, the number of modules 213, 214 can comprise individual modules at separate and distinct locations (e.g., CRM, etc.).

Each of the number of modules 213, 214 can include instructions that when executed by the processing resource 209 can function as a corresponding engine as described herein. For example, the TITO module 213 can include instructions that when executed by the processing resource 209 can function as the TITO engine 103. In another example, the transition module 214 can include instructions that when executed by the processing resource 209 can function as the transition engine 104.

Figure 3:
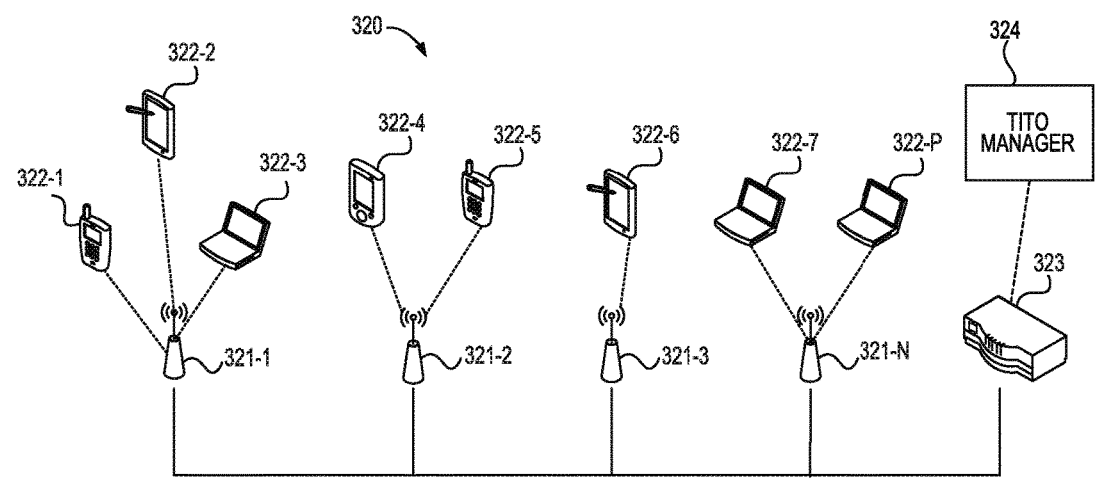
FIG. 3 is a diagram of an environment for load balancing among wireless APs in a network according to the present disclosure.

FIG. 3 is a diagram of an environment 320 for load balancing among wireless access points in a network according to the present disclosure. The environment 320 can include a WLAN and/or other wireless network. As illustrated in FIG. 3, the environment 320 can include a number of wireless APs 321-1, 321-2, 321-3, . . . 321-N (referred to collectively as wireless APs 321). Each of the number of wireless APs 321 can have a number of mobile devices 322-1, 322-2, 322-3, 322-4, 322-5, 322-6, 322-7, . . . , 322-P (referred to collectively as mobile devices 322) connected to them. Each of the wireless APs 321 can have a number mobile devices 322 connected to it. For example, wireless AP 321-1 can have three mobile devices connected to it (e.g., mobile devices 322-1, 322-2, 322-3), whereas wireless AP 321-3 can have one mobile device connected to it (e.g., mobile device 322-6). Similarly, each of the wireless APs 321 can have a number of differing and/or same mobile devices 322 connected to it. For instance, wireless AP 321-1 can have a mobile phone, a tablet computer, and a laptop computer connected to it (e.g., mobile devices 321-1, 321-2, 321-3), whereas wireless AP 321-N can have two laptop computers (e.g., mobile devices 322-7 and 322-P) connected to it.

As illustrated in FIG. 3, the wireless APs 321 can be connected to an access controller (AC) 323. In a number of examples, the AC 323 can manage the number of wireless APs 321, and can handle automatic adjustments to radio frequency (RF) power, channels, authentication, and security, as well as load-balancing.

Additionally, the environment 320 can include a TITO manager 324 to balance the traffic load among the wireless APs 321 based on real time wireless traffic. In a number of examples, the TITO manager 324 can be implemented as a separated third party device (e.g., a device provided and/or serviced by a third party supplier) in the network (e.g., environment 320), and/or within any existing device in the network with connection to all wireless APs 321. For example, referring to FIGS. 1-3, the TITO manager 324 can be executed by the TITO engine 103 and/or the TITO module 213. Similarly, the TITO manager 324 can be implemented by the AC 323 and/or any existing device in the network with connection to all wireless APs 321. In a number of examples, the TITO manager 324 can periodically collect and/or monitor the traffic information from the wireless APs 321 (e.g., traffic load of each AP, bandwidth of a mobile device, etc.). As discussed further herein, the TITO manager 324 can recalculate the wireless network traffic and determine whether certain mobile devices should be transferred from one AP to another. User specified criteria may be defined which dictate when the TITO manager 324 should recalculate the wireless network traffic and determine if certain mobile devices should be transferred. For example, the TITO manager 324 may recalculate wireless network traffic, when a period of elapsed time since the last calculation reaches a user specified threshold. For instance, the TITO manager 324 may recalculate wireless network traffic every five minutes. Similarly, the TITO manager 324 may recalculate wireless network traffic when a new mobile device (e.g., a mobile device not yet associated with a wireless AP in the network) connects to the network, and/or when an existing mobile device (e.g., a mobile device already associated with a wireless AP in the network) disconnects from the network. As discussed further herein, the TITO manager 324 may make a determination to transfer a connected mobile device (e.g., mobile device 322-1) to another wireless AP for better load-balancing and higher network throughput. For example, the TITO manager 324 may determine that a mobile device (e.g., mobile device 322-4) may achieve a greater bandwidth if it associated with wireless AP 321-1 instead of wireless AP 321-2.

Figure 4:
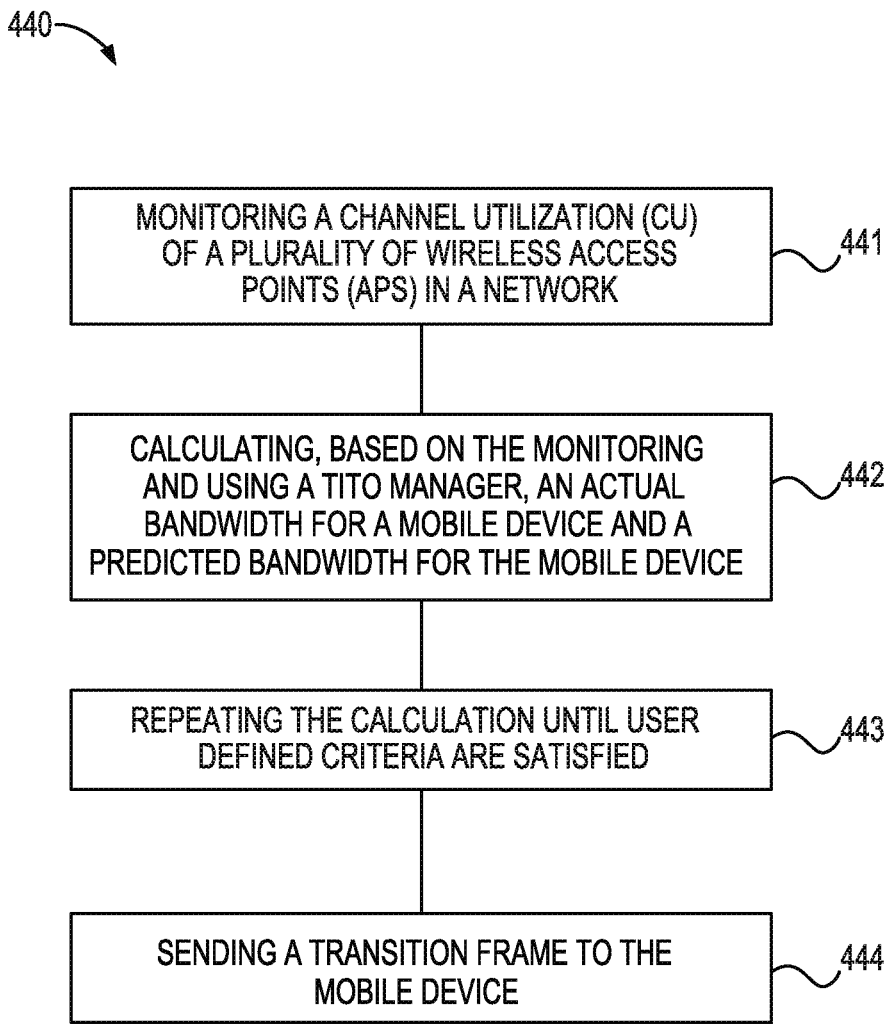
FIG. 4 is a flow chart of an example of a method for load balancing among access points according to the present disclosure.

As discussed further in relation to FIG. 4, the TITO manager 324 may implement both a transition-in (TI) model (e.g., transition-in algorithm) and a transition-out (TO) model (e.g., transition-out algorithm) to determine whether to transfer particular mobile devices to another wireless AP. The TI model and the TO model can execute independently of one another, simultaneously, and/or substantially simultaneously.

In a number of examples, the TITO manager 324 can determine whether a mobile device should dissociate from one wireless AP and associate with another. For example, using the TITO engine 103 and/or the TITO module 213, the TITO manager 324 can calculate a current bandwidth for a mobile device (e.g., mobile device 321-1) associated with a wireless AP (e.g., wireless AP 322-1). Similarly, the TITO manager 324 can determine (e.g., calculate) a predicted bandwidth for the mobile device (e.g., mobile device 321-1) that could be achieved if the mobile device associated with a different (e.g., second) wireless AP (e.g., wireless AP 322-2). By comparing the current bandwidth for the mobile device with the predicted bandwidth for the mobile device, the TITO manager 324 can determine whether the mobile device should dissociate from the first wireless AP and associate with the second wireless Further, when the TITO manager 324 makes a determination to transfer a connected mobile device to another wireless AP for better load balancing and higher network throughput, the transition engine 104 and/or the transition module 214 can implement the instructions provided by the TITO manager 324 (e.g., via the TITO engine 103 and/or the TITO module 213) by exchanging information between the mobile device, the first wireless AP, and the second wireless AP. For example, the TITO manager 324 may determine that wireless AP 321-1 is over-loaded and that better load balancing and higher throughput may be achieved if mobile device 322-1 were transferred to wireless AP 321-3. The transition engine 104 and/or transition module 214 can transmit a transition request (e.g., a BSS transition management request) to wireless device 322-1 and guide mobile device 322-1 to connect with wireless AP 321-3.

FIG. 4 is a flow chart of an example of a method 440 for load balancing among access points according to the present disclosure. As previously mentioned, the TITO manager can include two models (e.g., algorithms): a TI model and a TO model, which are presented below separately. However, examples are not so limited, and the TI model and the TO model can be executed simultaneously and/or substantially simultaneously.

At 441, the method 440 can include monitoring a channel utilization ratio (CU) of a plurality of wireless access points (APs) in a network. In both the TI and the TO models, the TITO manager can monitor the CU of each of the plurality of wireless APs, wherein the CU for a particular wireless AP reflects the traffic load for that particular wireless AP. At 442, the method 440 can include calculating, using the TITO manager, an actual bandwidth for a mobile device and a predicted bandwidth for the mobile device. At 443, the method 440 can include repeating the calculation until user-defined criteria are satisfied. As used herein, an actual bandwidth can include the existing (e.g., current) bandwidth the mobile device is using while associated with the first wireless AP. At 444, the method 440 can include sending a transition frame to the mobile device enabling it to dissociate with the first wireless AP and associate with a second wireless AP, in response to instructions from the TITO manager instructing the mobile device to dissociate from the first wireless AP and to associate with the second wireless AP. The method 440 is discussed further below, in relation to each of the TI model and the TO model.

Under the TI model, the TITO manager can identify all under-loaded wireless APs, wherein an under-loaded wireless AP includes a wireless AP with a CU less than a user specified threshold, and construct an array of under-loaded wireless APs, organized in ascending order according to CU. That is, the TITO manager can periodically sort wireless APs in ascending order according to the channel utilization of each wireless AP. Meanwhile, each wireless AP can also record the RSSI of mobile devices (e.g., by monitoring the probe request and/or other frames sent by the mobile device) in its vicinity, including those not connected to it, and sort those mobile devices in descending order according to the RSSI.

For example, under the TI model, the TITO manager can execute the following, expressed in pseudo code:

(1) monitor the $CU_{ap}$ for each wireless AP, and find all M wireless APs with a $CU_{ap} < 90\%$ (e.g., a user specified threshold of 90%), and put them in the M-size array (APU) in ascending order according to $CU_{ap}$.
(2) monitor the RSSI of each mobile device a wireless AP can receive, and put them in a N-size array $STA_{APUi}$ in descending order according $RSSI_{STAj,APi}$
(3) for (i=0; i<M; i++)
    (4) j←0
    (5) repeat
    (6)    if $STA_{APUi}$ is not connected to $APU_i$ then
    (7)    calculate the predicted available wireless bandwidth $STA_j$ can use from $APU_i$ using:
        $BW_{STAj,APUi}$ ← $Func_{R-D}$ ($RSSI_{STAj,APUi}$) × (1 − $CU_{APUi}$ + $CG_{APUi}$)
        $CG_{APUi}$ ← 1 ÷ ($nSTA_{APUi}$ + 1) × $CA_{APUi}$ wherein $BW_{STAj,APUi}$ is the predicted available wireless bandwidth a mobile device ($STA_j$) can use from an $AP_i$; $Func_{R-D}(x)$ is a RSSI-to-Data_rate mapping function that returns the predicted data rate based on the RSSI input x: and $CG_{APUi}$ is an expected channel gain of $AP_i$ through a Carrier Sense Multiple Access (CSMA) mechanism; and wherein $RSSI_{STAj,APUi}$ is the signal strength that the mobile device is receiving from a particular wireless AP. The model illustrated in (7) is merely an example of a model for calculating the predicted available wireless bandwidth $STA_j$ can use from $APU_i$. However, examples are not so limited, and a number of different models can be used.

(8) if $BW_{STAj,APUi}$>$B_{STAj}$+TH_BH
wherein $B_{STAj}$ is the actual bandwidth a mobile device (STA) is using from its associated wireless AP, and TH_BH is a fixed (e.g., user-defined) bandwidth value used as a threshold in determining whether to reassign a mobile device to another wireless AP.
    (9) Send BSS transition frame to $STA_{APUi,j}$ and instruct it to dissociate from its original AP and associate with $APU_i$
    (10) Update $CU_{APUi}$
    (11) end if
    (12) end if
    (13) j←j+1
    (14) until $CU_{APUi}$≥90% or j≥N
    (15) end for In (3) to (15), starting from the least loaded wireless AP, the TITO manager can execute the TI model to each wireless AP with less than the user specified threshold (e.g., 90%) channel utilization, until a threshold (e.g., all) M under-loaded wireless APs are processed. Furthermore, the TITO manager can calculate the maximized throughput a mobile device can have if it connects to the particular wireless AP under calculation in (7). If the bandwidth gain of the mobile device is larger than the user-defined threshold (TH_BW), then the wireless AP can send a transition frame (e.g., a BSS transition frame) to instruct the mobile device to transfer to the second wireless AP. In contrast, if the bandwidth gain of the mobile device is larger than the user-defined threshold, then a transition frame is not sent.

In an example, a particular mobile device (e.g., mobile device 322-1, illustrated in FIG. 3) can be connected to a first wireless AP (e.g., wireless AP 321-1, illustrated in FIG. 3) with an actual bandwidth of 5 Mbps, and the least loaded wireless AP can be wireless AP 321-3. In the same example, the user-defined threshold (e.g., TH_BW) can be 3 Mbps. After calculation, the predicted bandwidth that mobile device 322-1 can have with wireless AP 321-3 is 9 Mbps, which is larger than $B_{STAj}$+TH_BH (5+3=8 Mbps, see step 8). As a result of determining that the predicted bandwidth is larger than $B_{STAj}$+TH_BH, the wireless AP 321-1 can send a BSS transition request frame to mobile device 322-1 indicating an on-coming dissociation, and including the preferred wireless AP (e.g., wireless AP 321-3) to guide mobile device 322-1 to for re-association (as discussed in relation to 444 of method 440).

As discussed in relation to 443, the method 440 can include repeating the calculation until user-defined criteria are satisfied. In a number of examples, the user-defined criteria for the TI model can include at least one of: determining that the wireless AP being calculated has become an over-loaded wireless AP (e.g., with a $CU_{ap}$≥90%); and determining that no qualified mobile devices (e.g., mobile devices for which a calculation as not already executed) are available. As used herein, an over-loaded wireless AP includes a wireless AP with a CU greater than a user specified threshold.

Similarly, under the TO model, the TITO manager can identify all over-loaded wireless APs, wherein an over-loaded AP includes a wireless AP with a CU greater than a user specified threshold, and construct an array of over-loaded wireless APs, organized in descending order according to a number of mobile devices connected to each of the over-loaded wireless APs. That is, the TITO manager can periodically collect the number of connected mobile devices of each over-loaded AP, and sort them in descending order according to the data collected.

For example, under the TO model, the TITO manager can execute the following, expressed in pseudo code:

(1) monitor the $CU_{ap}$ for each wireless AP, find all M wireless APs with a $CU_{ap}$≥90%, and put them in an M-size array (APO) in descending order according to $_nSTA_{APi}$.
wherein $_nSTA_{APi}$ is the number of stations connected to the wireless AP.
    (2) for (i=0; i<M; i++)
        (3) k←1
        (4) fTrans←0
wherein fTrans is a flag to indicate whether a transition has occurred
        (5) repeat
        (6) Find the k-th largest $UR_{APi,STAj}$ in the $AP_i$ and mark that mobile device as $STA_j$
wherein $UR_{APi,STAj}$ is a channel utilization ratio of station $STA_j$ at $AP_i$ and is calculated by the following equation:

$$\Sigma_j UR_{APi,STAj} = CU_{APi}$$

(7) for (n=0; n<total number of AP; n++)
        (8) if ($STA_j$ is not connected to $AP_n$) and ($RSSI_{STAj,APn}$>$RSSI_{STAj,APi}$) then
        (9) calculate the predicted available wireless bandwidth $STA_j$ can use from $APU_i$ using:

$$BW_{STAj,APn} \leftarrow Func_{R-D}(RSSI_{STAj,APn}) \times (1-CU_{APn}+CG_{APn}) CG_{APn} \leftarrow 1 \div (nSTA_{APn}+1) \times CA_{APn}$$

(10) if ($BW_{STAj,APn}$−$B_{STAj}$+bandwidth gain of other STAs in $AP_i$)>TH_BW then

(11) Send BSS transition frame to $STA_j$ and instruct it to dissociate from its original $AP_i$ and associate with $AP_n$
(12) Update $CU_{AP}$
(13) fTrans←1
(14) end if
(15) end if
(16) end for
(17) if fTrans==0
(18) k←k+1
(19) end if
(20) Update $nSTA_{AP}$
(21) until k>$nSTA_{APi}$ or fTrans==1
(22) end for In (2) through (22), starting from the wireless AP with the most mobile devices connected to it, the TITO manager can execute the TO operation to each wireless AP with a channel utilization greater than a user-specified threshold (e.g., 90% channel utilization), until a threshold (e.g., all) M overloaded wireless APs are processed (e.g., there are no mobile devices for which a calculation has not been executed). Furthermore, in accordance with examples of the present disclosure, the TITO manager can identify a mobile device that has the largest channel utilization and calculate the predicted maximized throughput the mobile device could obtain if it connected to another (e.g., a second) wireless AP.

In an example, a particular mobile device (e.g., mobile device 322-3) can have the largest channel utilization among the mobile devices connected to the wireless AP (e.g., wireless AP 321-1). In the same example, the channel utilization of mobile device 322-3 can be 60%, the actual bandwidth can be 30 Mbps, and after calculation, the predicted bandwidth mobile device 322-3 can achieve with a second wireless AP (e.g., wireless AP 321-2) is 28 Mbps. However, in the example, the bandwidth gain of the other mobile devices in wireless AP 321-1 (e.g., mobile devices 322-1 and 322-2) is 6 Mbps. The calculation outlined in (10) above would result in values of (28−30)+6=8 Mbps>TH_BW=3 Mbps. Therefore, wireless AP 321-1 can send a BSS transition request frame to mobile device 322-3 indicating the on-coming dissociation, and including the preferred wireless AP for re-association (e.g., wireless AP 321-2) in the frame to guide mobile device 322-3 to reassociate (as discussed in relation to 444 of method 440).

As discussed in relation to 443, the method 440 can include repeating the calculation until user-defined criteria are satisfied. In a number of examples, the user-defined criteria for the TO model can include at least one of: the TITO manager instructing the mobile device to dissociate from the first wireless AP and to associate with the second wireless AP; and determining that no qualified mobile devices exist, wherein a qualified mobile device is a mobile device for which a calculation has not been executed.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N" and "P", particularly with respect to reference numerals in the drawings, indicate that a number of the particular feature and/or component so designated can be included with a number of examples of the present disclosure. The designators "N" and "P" can refer to a same feature and/or component, or different features and/or components.

As used herein, "logic" is an alternative or additional processing resource to perform a particular action and/or function, etc., described herein, which includes hardware, e.g., various forms of transistor logic, application specific integrated circuits (ASICs), etc., as opposed to computer executable instructions, e.g., software firmware, etc., stored in memory and executable by a processor. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed is:

1. A system for load balancing among wireless access points in a network, comprising:
    a plurality of wireless access points;
    a transition-in transition-out (TITO) engine to instruct a mobile station of a plurality of mobile stations associated with a first wireless access point selected from the plurality of wireless access points to dissociate from the first wireless access point when the first wireless access point is overloaded, and to associate with a second wireless access point selected from the plurality of wireless access point, based on real-time wireless traffic, wherein the real-time wireless traffic comprises at least one of channel utilization, throughput, and bandwidth, wherein the mobile station has a largest channel utilization among the plurality of mobile stations associated with the first wireless access point, and wherein associating with the second wireless access point increases a throughput of the mobile station and an overall bandwidth associated with the plurality of wireless access points; and
    a transition engine to implement an instruction from the TITO engine by exchanging information with the mobile station.

2. The system of claim 1, wherein the TITO engine is implemented as a third party device.

3. The system of claim 1, further comprising an access controller (AC) to manage the plurality of wireless access points, wherein the TITO engine is implemented by the AC.

4. The system of claim 1, wherein the TITO engine instructs the mobile station to dissociate from the first wireless access point and to associate with the second wireless access point in response to determining that the potential bandwidth gain for the mobile station is greater than a sum of a current bandwidth for the mobile station and a user-defined threshold.

5. A non-transitory computer readable medium storing instructions executable by a processing resource to cause a computer to:

monitor, from a plurality of wireless access points in a network, a traffic information;

calculate a current bandwidth for a client of a plurality of clients associated with a first wireless access point selected from the plurality of wireless access points, using a transition-in transition-out (TITO) manager based on the traffic information;

determine a predicted bandwidth for the client of the plurality of clients for each of the plurality of access points using the TITO manager, wherein the predicted bandwidth includes an available bandwidth the client could achieve by associating with a second wireless access point of the plurality of access points other than the first wireless access point; and determine, when the first wireless access point is overloaded, that the client should dissociate from the first wireless access point and associate with the second wireless access point selected from of the plurality of wireless access points, using the TITO manager and based on the current bandwidth and the predicted bandwidth of each of the plurality of access points, wherein the client has a largest channel utilization among the plurality of clients associated with the first wireless access point, and wherein the second wireless access point increases a throughput of the client and the predicted bandwidth of the second wireless access point is greater than the current bandwidth.

6. The non-transitory computer readable medium of claim 5, including instructions executable by the processing resource to:

instruct the first wireless access point to transmit a transition request to the client in response to determining that the client should dissociate from the first wireless access point and associate with the second wireless access point, using the TITO manager.

7. The non-transitory computer readable medium of claim 5, wherein the instructions executable by the processing resource to calculate the current bandwidth and determine the predicted bandwidth for the client are executed when a user specified criteria is satisfied.

8. The non-transitory computer readable medium of claim 7, wherein the user specified criteria includes at least one of:

a period of elapsed time reaches a user specified threshold;

a new client connects to the network; and an existing client disconnects from the network.

9. A method for load balancing among access points, comprising:

monitoring, from a plurality of wireless access points in a network, a channel utilization;

calculating, based on the channel utilization and using a transition-in transition-out (TITO) manager, an actual bandwidth for a mobile device of a plurality of mobile devices associated with a first wireless access point in the network and a predicted bandwidth for the mobile device, wherein:

the actual bandwidth includes an existing bandwidth the mobile device is using while associated with the first wireless access point; and the predicted bandwidth includes an available bandwidth the mobile device could achieve by dissociating with the first wireless access point and associating with a second wireless access point;

repeating the calculation until a user-defined criteria is satisfied; and sending a transition frame in response to the user-defined criteria being satisfied, to the mobile device enabling it to dissociate with the first wireless access point and associate with a second wireless access point, in response to the TITO manager instructing the mobile device to dissociate from the first wireless access point and to associate with the second wireless access point when the first wireless access point is overloaded, wherein the mobile device has a largest channel utilization of the plurality of mobile devices associated with the first wireless access point, and wherein the second wireless access point is predicted to increase a throughput of the mobile device for a potential bandwidth gain among the plurality of wireless access points.

10. The method of claim 9, wherein the user-defined criteria includes at least one of:

the TITO manager instructing the mobile device to dissociate from the first wireless access point and to associate with the second wireless access point; and a determination that the second wireless access point has become an over-loaded wireless access point.

11. The method of claim 9, wherein the user-defined criteria includes a determination that no qualified mobile devices exist, wherein a qualified mobile device is a mobile device for which a calculation has not been executed.

12. The method of claim 9, further including:

identifying a number of under-loaded wireless access points within the plurality of wireless access points, wherein an under-loaded access point includes an access point with a CU less than a user specified threshold; and constructing an array of the number of under-loaded wireless access points, organized by the TITO manager in ascending order according to CU.

13. The method of claim 12, wherein the second wireless access point has a lower CU than the first wireless access point.

14. The method of claim 9, further including:

identifying a number of over-loaded wireless access point, wherein an over-loaded wireless access point includes an access point with a CU greater than a user specified threshold; and constructing an array of the number of over-loaded wireless access points, organized by the TITO manager in descending order according to a number of mobile devices connected to each of the over-loaded wireless access points.

15. The method of claim 14, wherein the first wireless access point has a highest number of mobile devices connected to it among an array of over-loaded wireless access points.

* * * * *